United States Patent
Fujii et al.

(10) Patent No.: US 6,503,966 B1
(45) Date of Patent: Jan. 7, 2003

(54) GELLED NON-AQUEOUS BALL POINT PEN INK FOR FORMING DRAWN LINE APPROXIMATE TO THAT OF AQUEOUS BALL POINT PEN AND BALL POINT USING THE INK

(75) Inventors: Takeshi Fujii, Gunma (JP); Kahori Funabashi, Gunma (JP); Teruaki Fukasawa, Gunma (JP)

(73) Assignee: Kabushiki Kaisha Pilot, Tokyo (JP)

( * ) Notice: Subject to any disclaimer, the term of this patent is extended or adjusted under 35 U.S.C. 154(b) by 11 days.

(21) Appl. No.: 09/708,648

(22) Filed: Nov. 9, 2000

(30) Foreign Application Priority Data

Nov. 18, 1999 (JP) .............................. 11-365207

(51) Int. Cl.$^7$ .................. C09D 11/18; C08L 39/06; C08L 91/06
(52) U.S. Cl. .................. 523/161; 524/489; 524/548
(58) Field of Search ................... 523/160, 161; 106/31.27, 31.28, 31.29, 31.6, 31.61; 524/489, 548

(56) References Cited

U.S. PATENT DOCUMENTS

| | | | | |
|---|---|---|---|---|
| 5,314,531 A | * | 5/1994 | Huber et al. ............. | 106/31.37 |
| 5,929,135 A | * | 7/1999 | Wasai et al. ............. | 523/161 |
| 6,004,388 A | * | 12/1999 | Osada ............. | 106/31.57 |

FOREIGN PATENT DOCUMENTS

| | | |
|---|---|---|
| EP | 0 702 066 | 3/1996 |
| EP | 0 806 461 | 11/1997 |
| JP | 03019897 A | * 1/1991 |
| JP | 08311388 A | * 11/1996 |
| JP | 09302298 A | * 11/1997 |
| WO | 97/40110 | 10/1997 |

OTHER PUBLICATIONS

Alger, Mark; Polymer Science Dictionary 2$^{nd}$ Ed., Chapman& Hall, London 1989 (page 469).*

* cited by examiner

Primary Examiner—Vasu Jagannathan
Assistant Examiner—Callie E. Shosho
(74) Attorney, Agent, or Firm—Rader, Fishman & Grauer PLLC

(57) ABSTRACT

A non-aqueous ball point pen ink of this invention includes a colorant, an organic solvent, a non-Newtonian viscosity imparting agent and a thickening agent as main components. The thickening agent comprises only polyvinyl pyrrolidone with a weight-average molecular weigh of about 40,000 to 55,000. A non-Newtonian viscosity index of the ink is not less than 0.1 and less than 0.4, a viscosity in a shearing speed of 500 sec$^{-1}$ is not less than 1,000 and less than 3,000 mPa•s at 20° C., and the viscosity in the shearing speed of 0.19 sec$^{-1}$ is not less than 40,000 mPa•s and not more than 70,000 mPa•s at 20° C.

6 Claims, No Drawings

GELLED NON-AQUEOUS BALL POINT PEN INK FOR FORMING DRAWN LINE APPROXIMATE TO THAT OF AQUEOUS BALL POINT PEN AND BALL POINT USING THE INK

FIELD OF THE INVENTION

The present invention relates to a non-aqueous ball point pen ink and a ball point pen using the ink. Specifically, the present invention relates to a non-aqueous ink provided with pseudoplasticity. The ink is provided by blending a non-Newtonian viscosity imparting agent while applying a cohesive force by blending a thickening agent comprising polyvinyl pyrrolidone with a weight-average molecular weight of about 40,000 to 100,000 to eliminate ink blobbing and scratching. The present also related to a non-aqueous ball point pen using this ink.

BACKGROUND OF THE INVENTION

A conventional non-aqueous ball point pen has been designed by setting an ink viscosity in a range of 10,000 to 30,000 mPa•s at 20° C. to prevent leakage. However, when the viscosity during writing is high in this manner, the ball rotation resistance during writing automatically increases and writing smoothness is very low and fails to be satisfactory. Moreover, a high writing pressure is necessary during writing. In some cases, a load of 500 gf or more is applied to a pen point. The heavy load causes the pen point to be quickly damaged. Furthermore, ball breakage and writing defects frequently occur as a consequence. On the other hand, as disclosed in Japanese Patent Application Laid-Open Nos. 6-313143 (1994), 6-313144 (1994), 7-196972 (1995) and 9-48941 (1997), attempts were carried out to improve the above-described defects by creating inks having a pseudoplasticity viscosity property, where the ink viscosity during writing is low and where the ink viscosity is relatively high when writing is not performed. However, the but the attempts were not sufficient in enhancing the writing smoothness and completely preventing the leakage.

SUMMARY OF THE INVENTION

The present invention provides an ink which realizes a remarkably satisfactory writing smoothness, can be untilized for low pressure writing such as in conjunction with an aqueous ball point pen, forms a fresh drawn line, eliminates blobbing and feathering, and can completely prevent leakage. The present invention further provides a non-aqueous ball point pen in which no ink adheres to an ink reserving tube inner wall and an ink residual amount is clear.

The present invention relates to a non-aqueous ball point pen ink or ink composition in which a colorant, an organic solvent, a non-Newtonian viscosity imparting agent, and a thickening agent comprising only polyvinyl pyrrolidone with a weight-average molecular weight of about 40,000 to 100,000 are contained as main components. A non-Newtonian viscosity index of the ink may be as low as 0.1 and less than 0.4. The viscosity of the ink a shearing speed of 500 sec$^{-1}$ may be as low as 1,000 and less than 3,000 mPa•s at 20° C. The viscosity of the ink in the shearing speed of 0.19 sec$^{-1}$ may be as low as 40,000 mPa•s at 20° C. and as high as 70,000 mPa•s at 20° C. The non-aqueous ball point pen ink of this invention may contain polyvinyl pyrrolidone with the weight-average molecular weight of about 40,000 to 100,000 in a range of 1 to 3 mass % with respect to a total amount of the ink composition. The non-Newtonian viscosity imparting agent may be a fatty acid amide wax with a melting temperature of 140° C. or more, and the content may be in a range of 2 to 5 mass % with respect to the total amount of the ink composition.

The ink may be directly filled into an ink reserving tube of a ball point pen. The ink reserving tube of the ball point pen may be a polypropylene tube with silicone applied to an inner face.

PREFERRED EMBODIMENTS OF THE INVENTION

Various measures for enhancing a ball point pen stroke have been studied. Above all, it is a known fact that a ball rotation resistance exerts a remarkably large influence on the stroke, and it is also obvious that the ball rotation resistance depends on ink viscosity. Specifically, in order to enhance the stroke, it is a most effective measure to set the ink viscosity during writing to be as low as possible and reduce the ball rotation resistance. However, when the ink viscosity is set to be excessively low, problems such as leakage and blobbing, non-uniform line darkening ("scratching") and blurring ("feathering") due to absorption by paper, etc. naturally increase. As described above, the technique of setting pseudoplasticity as an ink viscosity property to solve these problems has been disclosed, but the writing with a remarkably low pressure like an aqueous ball point pen and smooth sroke have not been realized, and a fresh drawn line has not been obtained.

Concretely, in order to enable the writing with the remarkably low pressure like the aqueous ball point pen, realize the smooth stroke and obtain the fresh drawn line, the ink viscosity during writing should preferably be less than 3,000 mPa•s. In the present invention, a non-aqueous ink has been studied based on the prerequisite to invent a non-aqueous ball point pen ink which prevents leakage and blobbing, further scratching, and feathering from occurring, provides a superior touch, obtains a satisfactory drawn line and which causes no leakage. The blobbing means a phenomenon in which surplus ink during writing is accumulated in a pen point.

In the present invention, the viscosity in a shearing speed of 500 sec$^{-1}$ may be as low as 1,000 and less than 3,000 mPa•s at 20° C., even though ink outside of this range is still acceptable. This is a viscosity area essential for realizing a remarkably smooth stroke, and obtaining a fresh drawn line like the aqueous ball point pen. With the viscosity less than 1,000 mPa•s, the problem of feathering cannot be effectively prevented. Moreover, no satisfactory oil film can be formed between a ball and a ball seat and the intrinsic smoothness of the non-aqueous ball point pen can be deteriorated. On the other hand, with the viscosity of 3,000 mPa•s or more, it is difficult to obtain a fresh drawn line relative to that obtained by an aqueous ball point pen. Specifically, in order to obtain a satisfactory stroke, the ink viscosity in the shearing speed of 500 sec$^{-1}$ should preferably be set substantially to 10,000 mPa•s or less. However, when the viscosity is 3,000 mPa•s or more, a complete transfer type ball point pen, that is, a writing system of transferring the ink to a paper surface only via the ball can be constituted, the penetration to paper is reduced because of the high viscosity and no fresh drawn line can therefore be obtained.

According to experiments by the inventors of the present invention, when the ink viscosity in the shearing speed of 500 sec$^{-1}$ is less than 3,000 mPa•s, a writing utensil also utilizing the penetration to the paper surface can be obtained and a very fresh drawn line can be obtained. The ink viscosity described herein is measured in a measurement environment of 20° C. using a rheometer CSL manufactured by British Carrymay, Ltd.

The most important constituting requirement in the present invention lies in that the ink viscosity in the shearing speed of 500 sec$^{-1}$ is set as low as 1,000 and less than 3,000 mPa•s at 20° C., a non-Newtonian viscosity index is set as low as 0.1 and less than 0.4, remarkably low, the viscosity in the shearing speed of 0.19 sec$^{-1}$ is further set to 40,000 mPa•s (at 20° C.) or more, and the ink is provided with pseudoplasticity. The necessity for setting the ink viscosity during writing to be low has been described above, but in this viscosity area, the leakage and blobbing, further scratching, and feathering could be increased. In order to prevent these defects, the necessity of setting the non-Newtonian viscosity index as low as 0.1 and less than 0.4 and setting the viscosity in the shearing speed of 0.19 sec$^{-1}$ to 40,000 mPa•s at 20° C. or more arises. In other words, the above-described defects can be prevented by setting the pseudoplasticity as the ink viscosity property to be strong and setting the ink viscosity to be high during low shearing, that is, when not writing with the ball point pen. Additionally, when the ink viscosity exceeds 70,000 mPa•s (at 20° C.), ink fluidity can be lowered, ink follow-up property during writing can be deteriorated, and the inappropriate writing ink therefore preferably has to be avoided.

When the non-Newtonian viscosity index is less than 0.1, the pseudoplasticity can be excessively strong, and the ink follow-up defect may arise. In general, when the non-Newtonian viscosity index is less than 0.4, the cohesive force of the ink itself can become excessively strong and the ink follow-up defect may arise. However, when the ink viscosity in the shearing speed of 500 sec$^{-1}$ is less than 3,000 mPa•s, no channel resistance can be generated in a chip tip end as the thinnest part of an ink passage and no ink follow-up defect arises. On the other hand, when the non-Newtonian viscosity index is 0.4 or more, the pseudoplasticity increases. When the ink viscosity in the shearing speed of 500 sec$^{-1}$ is set to no less than 1,000 and less than 3,000 mPa•s (at 20° C.), the leakage and blobbing, further scratching, and feathering cannot be prevented.

Furthermore, in order to thoroughly prevent the leakage, the viscosity in the shearing speed of 0.19 sec$^{-1}$ should be 40,000 mPa•s at 20° C. When it is less than 40,000 mPa•s, the leakage cannot completely be prevented.

The non-Newtonian viscosity imparting agent for use in the non-aqueous ink includes a fatty acid amide wax and a derivative thereof, linear chain fatty acid ester polymer, polyethylene oxide, hardened castor oil, organic bentonite, silica, sulfate-based anion activator, and the like, but the fatty acid amide wax is preferable based on stability. Further, considering the stability during the high-temperature preservation of the ball point pen, it is most preferable to select the fatty acid amide wax with a melting temperature of 140° C. or more as the non-Newtonian viscosity imparting agent. The addition amount of the fatty acid amide wax varies with other blend amounts, but can be substantially in a range of 2.0 to 5.0 mass % in order to realize the non-Newtonian viscosity index of no less than 0.1 and less than 0.4.

The non-Newtonian viscosity index described herein is measured using the rheometer CSL manufactured by British Carrymay, Ltd., in a measurement environment of 20° C. with appropriate values of angle and diameter of a cone plate in a shearing speed range of 1 to 600 sec$^{-1}$.

The essential requirement of the present invention lies in that a colorant, an organic solvent, a non-Newtonian viscosity imparting agent, and a thickening agent comprising only polyvinyl pyrrolidone with a weight-average molecular weight of, preferably, 40,000 to 100,000 are contained as main components, and to obtain a satisfactory touch and fresh drawn line, the ink viscosity in the shearing speed of 500 sec$^{-1}$ should preferably be set to no less than 1,000 and less than 3,000 mPa•s at 20° C.

Additionally, in general, in order to prevent the blobbing, a measure of employing polyvinyl pyrrolidone with a preferable weight-average molecular weight of 1,000,000 to 3,000,000 is used. This is actually a remarkably effective measure when the ink viscosity in the shearing speed of 500 sec$^{-1}$ is 3,000 mPa•s or more, but with the low viscosity of less than 3,000 mPa•s as in the present invention, the effect is little, and the scratching is increased in vain. To describe that further, for polyvinyl pyrrolidone with the weight-average molecular weight of 40,000 to 100,000, the ball wetting with the ink is satisfactory in the pen point, and the scratching and line skipping are effectively prevented. Specifically, when the ink viscosity in the shearing speed of 500 sec$^{-1}$ is not less than 1,000 and less than 3,000 mPa•s (at 20° C.), the satisfactory drawn line cannot be formed with the thickening agent other than polyvinyl pyrrolidone with the weight-average molecular weight of 40,000 to 100,000.

As polyvinyl pyrrolidone with the weight-average molecular weight of about 40,000 to 100,000, PVP K-30 (manufactured by GAF, Ltd., weight-average molecular weight of 55,000) is exemplified. The blend amount in the ink is preferably in a range of 1 to 3 mass % with respect to the total composition. With the amount less than 1 mass % there is a problem that the scratching cannot sufficiently be prevented, and conversely scratching easily arises with the amount exceeding 3 mass %.

The present inventors set the ink viscosity in the shearing speed of 500 sec$^{-1}$ to no less than 1,000 and less than 3,000 mPa•s at 20° C. in order to realize a satisfactory touch and to obtain a fresh drawn line like the aqueous ball point pen ink. Moreover, the non-Newtonian viscosity index was set as low as 0.1 and less than 0.4, remarkably low, and the viscosity in the shearing speed of 0.19 sec$^{-1}$ was set to 40,000 mpa.s or more, so that the contribution to prevention of the blobbing, leakage and feathering was made. Furthermore, scratching was prevented by using only polyvinyl pyrrolidone with the weight-average molecular weight of 4 to 50,000 as the thickening agent component. Specifically, the combination of these requirements is indispensable, and important because the target cannot be achieved when even one of them is lacking.

Other main components of the present invention will additionally be described. The colorant can be used without being particularly limited to the conventional dye or pigment employed in the non-aqueous ball point pen. Examples of the pigment include organic, inorganic and processed pigments, such as carbon black, phthalocyanine, azo, quinacridone, anthraquinone, and indigo pigments. Moreover, as the dye, an alcohol-soluble dye, oil-soluble dye, direct dye, acid dye, basic dye, metallized dye, and various salt-forming type dyes can be employed. Moreover, these can be used alone or as a mixture. The blend proportion is in a range of 5 to 50 mass %, preferably 20 to 40 mass % with respect to the total ink composition.

The organic solvent for use in the present invention is used as an ink composition solvent or dispersing medium. Concretely, alcohol and glycol solvents such as benzyl alcohol, propylene glycol and butylene glycol, Cellosolve solvents such as phenyl CELLOSOLVE, CARBITOL solvents such as phenyl CARBITOL, and nitrogen-containing solvents such as N-methyl pyrrolidone can be used alone or as a mixture. The blend proportion is preferably in a range of 30 to 70 mass % with respect to the total ink composition.

Here, a ball point pen structure will be described. For an ink reserving tube for the non-aqueous ball point pen, usable materials are limited from the standpoints of chemical resistance, moisture permeability, air permeability, and the like. In this respect, it has heretofore been most general to use polypropylene as the material. However, in the present invention particularly when the fatty acid amide wax is selected as the non-Newtonian viscosity imparting agent, the fatty acid amide wax has a very strong affinity for polypropylene. Therefore, as the ink is transferred from the ink reserving tube, a defect is generated that the ink adheres to the inner wall and the ink residual amount fails to be clarified. As a countermeasure against the defect, the present inventor et al. have found that when the ink reserving tube is formed of polypropylene, the ink reserving tube inner wall is to be treated with silicone. When silicone is applied to the ink reserving tube inner wall, polypropylene as the reserving tube material does not directly contact the ink and keeps a relation that silicone is interposed, so that during the movement of the ink, the prevention of adherence to the reserving tube inner wall is embodied. As a silicone material, TSF-4420 (Toshiba Silicone Co., Ltd.) is exemplified. It is a most effective application method to simultaneously and uniformly apply silicone to the inner wall during extrusion molding.

When a tube of polyethylene terephthalate or nylon is used as the ink reserving tube, the application of silicone is not necessarily required.

Examples

Examples will next be described concretely.

Example 1

| | |
|---|---|
| NIGROSINE EX | 15.0 mass % |
| VALIFAST VIOLET 1701 | 15.0 mass % |
| phenyl glycol | 39.0 mass % |
| benzyl alcohol | 26.0 mass % |
| fatty acid amide wax | 4.0 mass % |
| polyvinyl pyrrolidone K-30 | 1.0 mass % |

By mixing, then heating at 60° C. and stirring the above-described components, dissolving dyes and resin, and uniformly dispersing the fatty acid amide wax in the ink, a black non-aqueous ball point pen ink was obtained. NIGROSINE EX, and VALIFAST VIOLET 1701 (both are dyes manufactured by Orient Kagaku Kogyo K. K.) were used as the dyes to adjust a color in black. For the fatty acid amide wax as the non-Newtonian viscosity imparting agent, TAREN 7200 (manufactured by Kyoeisha Kagaku K. K.) was employed. As a viscosity adjuster and a drawn line adjuster, polyvinyl pyrrolidone K-30 (manufactured by GAF Co., Ltd., weight-average molecular weight of 55,000) was employed. Here, by directly inserting the obtained black non-aqueous ball point pen ink into the polypropylene ink reserving tube with the inner wall treated by silicone (TSF-4420 manufactured by Toshiba Silicone Co., Ltd.), and mounting the ink reserving tube in a shaft cylinder, the non-aqueous ball point pen was formed.

Examples 2 to 7

The non-aqueous ball point pen was formed similarly as the example 1 except that the ink composition shown in Table 1 was used. Effects are shown in Table 1.

Comparative Examples 1 to 11

The non-aqueous ball point pen was formed similarly as the example 1 except that the ink composition shown in Table 2 was used.

Test and Evaluation

With respect to the respective non-aqueous ball point pens of the examples 1 to 7 and comparative examples 1 to 11, the following test and evaluation were performed.

(1) Writing Smoothness: Evaluation by Manual Writing

Low pressure writing is possible to such an extent that writing is possible with a ball point pen weight, smooth and particularly satisfactory . . . ◎

Satisfactory . . . ○

Slightly inferior . . . Δ

Low pressure writing is impossible, and no smooth touch . . . x (2) Freshness of Drawn Line Evaluation of Drawn Line Immediately After Writing.

Ink is put on paper surface in the same manner as in aqueous ball point pen drawn line, and particularly fresh-looking . . . ◎

Fresh-looking . . . ○

Drawn line slightly transferred to paper surface, or immediately penetrating . . . Δ

Drawn line completely transferred to paper surface . . . x

The ink was uniformly and freshly put on the paper surface, there was a sense of fulfillment in writing, and then this was evaluated to be satisfactory.

(3) Blobbing

By setting a writing load to 1.96 N (200 gf) and a writing angle to 65°, and using a writing tester for spiral writing at a writing speed of 4 m/min., the state after the writing of 100 m was confirmed.

No blobbing in drawn line, no drop (ink rising) in pen point . . . ◎

Less than one blob in drawn line, drop very slightly generated . . . ○

One to five blobs in drawn line, drop slightly generated . . . Δ

Five or more blobs in drawn line, drop remarkably generated . . . x (4) Feathering After writing characters on a writing sheet A in an environment of 30° C. and 60%RH and leaving a written sheet surface to stand in the similar environment for 24 hours, the feathering was checked.

No feathering in drawn line . . . ◎

Almost no feathering . . . ○

Slight feathering . . . Δ

Remarkable feathering . . . x (5) Ink Wetting

After leaving the ball point pen to vertically stand in an environment of 40° C. and 95%RH with a chip facing downward for 24 hours, the leakage from the pen point was checked.

No leakage from pen point confirmed . . . ◎

Almost no leakage from pen point confirmed . . . ○

No ink rising confirmed up to ¼ of chip taper part . . . Δ

Ink rising by ¼ of chip taper part or more . . . x

The evaluation results of the respective examples and comparative examples are shown in Tables 1 and 2.

TABLE 1

| | Example | | | | | | |
|---|---|---|---|---|---|---|---|
| | 1 | 2 | 3 | 4 | 5 | 6 | 7 |
| Ink blend | | | | | | | |
| NIGROSINE EX | 15.0 | 15.0 | 15.0 | 15.0 | 15.0 | 15.0 | 15.0 |
| VALIFAST VIOLET 1701 | 15.0 | 15.0 | 15.0 | 15.0 | 15.0 | 15.0 | 15.0 |
| Phenyl glycol | 39.0 | 38.7 | 37.8 | 39.9 | 40.2 | 38.0 | 38.4 |
| Benzyl alcohol | 26.0 | 25.8 | 25.2 | 24.9 | 26.8 | 25.5 | 25.6 |
| Fatty acid amide wax | 4.0 | 3.0 | 4.0 | 2.5 | 2.0 | 3.0 | 5.0 |
| Polyvinyl pyrrolidone K-30 | 1.0 | 2.5 | 3.0 | 2.7 | 1.0 | 3.5 | 1.0 |
| Ink physical properties | | | | | | | |
| Non-Newtonian viscosity index | 0.1 | 0.38 | 0.35 | 0.39 | 0.38 | 0.39 | 0.2 |
| Ink viscosity (at. 20° C., 500 sec$^{-1}$) | 1100 | 2250 | 2900 | 2500 | 1000 | 2900 | 1000 |
| Ink viscosity (at. 20° C., 0.19 sec$^{-1}$) | 55000 | 50000 | 70000 | 40000 | 45000 | 51000 | 60000 |
| Ball point pen performance | | | | | | | |
| Smoothness | ◎ | ◎ | ○ | ◎ | ◎ | ○ | ◎ |
| Freshness | ◎ | ◎ | ○ | ○ | ◎ | ○ | ◎ |
| Blobbing | ○ | ○ | ◎ | ◎ | ○ | ◎ | ○ |
| Feathering | ○ | ◎ | ◎ | ◎ | ○ | ◎ | ○ |
| Leakage | ◎ | ◎ | ◎ | ◎ | ◎ | ◎ | ◎ |

TABLE 2

| | Comparative example | | | | | | | | | | |
|---|---|---|---|---|---|---|---|---|---|---|---|
| | 1 | 2 | 3 | 4 | 5 | 6 | 7 | 8 | 9 | 10 | 11 |
| Ink blend | | | | | | | | | | | |
| NIGROSINE EX | 15.0 | 15.0 | 15.0 | 15.0 | 15.0 | 15.0 | 15.0 | 15.0 | 15.0 | 15.0 | 15.0 |
| VALIFAST VIOLET 1701 | 15.0 | 15.0 | 7.0 | 15.0 | 15.0 | 15.0 | 15.0 | 15.0 | 15.0 | 15.0 | 15.0 |
| phenyl glycol | 39.6 | 38.4 | 41.4 | 38.7 | 36.0 | 52.2 | 39.0 | 36.3 | 40.4 | 50.5 | 52.6 |
| benzyl alcohol | 26.4 | 25.6 | 27.6 | 25.5 | 24.0 | 13.0 | 26.0 | 24.2 | 26.9 | 12.6 | 13.2 |
| fatty acid amide wax | — | 6.0 | 8.0 | 1.8 | 8.0 | 2.8 | 4.0 | 6.0 | 1.7 | 3.2 | 3.0 |
| polyvinyl pyrrolidone K-90 | — | — | — | — | — | — | — | — | — | — | 1.2 |
| polyvinyl pyrrolidone K-30 | 4.0 | — | 1.0 | 4.0 | 2.0 | 2.0 | 1.0 | 3.5 | 1.0 | 3.7 | — |
| Ink physical properties | | | | | | | | | | | |
| non-Newtonian viscosity index | — | 0.1 | 0.05 | 0.43 | 0.05 | 0.43 | 0.1 | 0.1 | 0.38 | 0.38 | 0.35 |
| ink viscosity (at. 20° C., 500 sec$^{-1}$) | 2900 | 1200 | 700 | 3200 | 1200 | 2500 | 800 | 3300 | 800 | 3200 | 2300 |
| ink viscosity (at. 20° C., 0.19 sec$^{-1}$) | 2900 | 58000 | 80000 | 50000 | 95000 | 43000 | 50000 | 240000 | 38000 | 51000 | 53000 |
| Ball point pen performance | | | | | | | | | | | |
| smoothness | △ | △ | × | × | × | △ | ○ | × | ○ | × | × |
| freshness | × | △ | × | × | × | × | △ | × | × | × | × |
| blobbing | × | × | × | × | × | × | × | × | × | × | × |
| feathering | × | × | × | ○ | × | ◎ | × | ◎ | × | ◎ | ◎ |
| leakage | × | ◎ | ◎ | △ | ◎ | △ | △ | ◎ | × | ◎ | ◎ |

As not described in Tables 1 and 2, for the ball point pens of the respective examples and comparative examples, the ink was transferred from the ink reserving tube with ink consumption by the respective tests. In this case, since no ink adhered to the ink reserving tube inner wall, it was possible to clearly confirm the ink residual amount.

The comparative example 1 is an example in which the fatty acid amide wax as the non-Newtonian viscosity imparting agent was not contained in the ink components. The ink viscosity property of course failed to indicate the pseudo-plasticity. In this case, even when an attempt was made to embody a satisfactory writing smoothness for use by setting the ink viscosity to be as low as possible, the control of ink flow became impossible and a sense of discomfort was generated during writing. Moreover, since the ink viscosity property indicated no pseudoplasticity, and the ink viscosity in the shearing speed of 500 sec$^{-1}$ was set to be low, the ink penetrated the paper surface remarkably fast and simultaneously with writing, so that the ink was not uniformly put on the paper surface like the aqueous ink and a so-called fresh drawn line was not obtained. Also regarding the blobbing, since the ink flow could not be controlled well and the viscoelasticity of the ink was insufficient, the performance was not satisfactory. Furthermore, since the ink was not pseudoplastic, the attempts to set the ink viscosity in the shearing speed of 500 sec$^{-1}$ to not less than 1000 and less than 3000 mPa•s and to set the ink viscosity in the shearing speed of 0.19 sec$^{-1}$ to 4000 mPa•s or more could not be achieved, and the leakage occurred.

The comparative example 2 is an example in which polyvinyl pyrrolidone K-30 was not contained in the ink component. The blend by which no leakage occurred could be embodied by adjusting the fatty acid amide wax as the non-Newtonian viscosity imparting agent, but the ink was not easily uniformly put on the pen point ball and the satisfactory writing smoothness and fresh drawn line could not be embodied. Moreover, only with the fatty acid amide wax, the ink viscoelasticity became insufficient and the blobbing performance was not satisfactory. Moreover, the feathering was not improved for the similar cause.

The comparative example 3 is an example in which the non-Newtonian viscosity index was excessively low and the ink fluidity is remarkably deteriorated. Since the ink fluidity was deteriorated, the satisfactory writing smoothness and drawn line could not be embodied. Moreover, the viscosity during writing was remarkably deteriorated by the pen point ball rotation, and the feathering could not be controlled even if the writing was possible.

The comparative example 4 is an example in which the ink non-Newtonian viscosity index exceeds 0.4 and the ink viscosity in the shearing speed of 500 $sec^{-1}$ exceeded 3,000 mPa•s. In this case, the ink viscosity during writing was excessively high and the satisfactory writing smoothness and fresh drawn line could not be embodied. Moreover, the ink viscoelasticity became insufficient and the blobbing could not be controlled. Since the surplus ink by blobbing was transferred in the drawn line, the feathering of this part could not be said to be satisfactory. On the other hand, the ink viscosity at 0.19 $sec^{-1}$ was 40,000 mPa•s or more, but the non-Newtonian viscosity index was higher than the target and the pseudoplasticity was therefore low, and the leakage could not sufficiently be handled.

The comparative example 5 is an example in which the non-Newtonian viscosity index was set to be excessively low similarly as the comparative example 3. The ink viscosity in the shearing speed of 500 $sec^{-1}$ was set to 1,200 mPa•s within the target range of not less than 1,000 and less than 3,000 mPa•s, but this further deteriorated the ink fluidity. The evaluation was similar to that of the comparative example 3.

The comparative example 6 is an example in which the non-Newtonian viscosity index exceeded 0.4 similarly to the comparative example 4, but the ink viscosity in the shearing speed of 500 $sec^{-1}$ was set to 2,500 mPa•s as targeted. Since the pseudoplasticity of the ink was weakened, the ink viscosity in the shearing speed of 0.19 $sec^{-1}$ slightly exceeded 40,000 mPa•s, which was the limitation. It was impossible to set the ink viscosity in the shearing speed of 500 $sec^{-1}$ to be lower, because the leakage was directly caused. Moreover, the ink viscosity in the shearing speed of 500 $sec^{-1}$ was set as targeted, but by the ball rotation of the pen point the ink viscosity was not lowered as expected, and the satisfactory writing performance could not be obtained.

The comparative example 7 is an example in which the ink viscosity in the shearing speed of 500 $sec^{-1}$ was below the target. An effort was made to set the non-Newtonian viscosity index to be as low as possible and set the ink viscosity in the shearing speed of 0.19 mp $sec^{-1}$ to the target of 40,000 mPa•s or more. In this case, by the ball rotation during writing the ink viscosity was excessively low, the ink flow could not be controlled, and the satisfactory writing performance could not be obtained.

The comparative example 8 is an example in which the ink viscosity in the shearing speed of 500 $sec^{-1}$ exceeded the target. Contrary to the comparative example 4, the non-Newtonian viscosity index was set to be extremely low to strengthen the ink pseudoplasticity, but only the feathering and leakage performance were improved, and the writing performance failed to be improved similarly as the comparative example 4. In this blending, it was expected as the effect from the strengthened ink pseudoplasticity that the ink viscosity became appropriate by the ball rotation during writing. However, the ink viscoelasticity was excessively high, and a smooth ink flow could not be formed. Therefore, the satisfactory writing smoothness and fresh drawn line could not be embodied, and the blobbing performance was not satisfactory by lack of the ink smoothness.

The comparative example 9 is an example in which the ink viscosity in the shearing speed of 500 $sec^{-1}$ and the ink viscosity in the shearing speed of 0.19 $sec^{-1}$ were both lower than the target. An effort was made to control the ink flow by setting the non-Newtonian viscosity index to be as high as possible, but a sufficient effect could not be obtained. The ink viscosity during writing was excessively low, the penetration to the paper surface was excessively fast and no fresh drawn line could be obtained. Similarly the feathering could not be satisfactory. Of course, the leakage also occurred.

The comparative example 10 is an example in which only the ink viscosity in the shearing speed of 500 $sec^{-1}$ was set to be higher than the target. Of course, the target writing performance could not be obtained.

The comparative example 11 is an example in which polyvinyl pyrrolidone K-90 with a weight-average molecular weight of 1,280,000 was employed instead of polyvinyl pyrrolidone K-30. The ink physical properties were set as targeted, but the ink viscoelasticity was so strong that the target writing performance could not be obtained.

The non-aqueous ball point pen ink and the ink-containing ball point pen of the present invention are characterized in that the writing smoothness is remarkably satisfactory, the writing is possible with the low pressure like the aqueous ball point pen ink, the fresh drawn line can be formed, neither blobbing nor feathering is found, and the leakage can completely be prevented. Moreover, the fatty acid amide wax is particularly selected as the non-Newtonian viscosity imparting agent, and for the ink reserving tube of polypropylene, the ink reserving tube inner wall surface is treated with silicone, so that no ink adheres to the inner wall surface and therefore the ink residual amount can advantageously be confirmed clearly.

The disclosure of Japanese Patent Application No. 11-365207 filed Nov. 18, 1999, including specification, drawings and claims are herein incorporated by reference in its entirety.

What is claimed is:

1. A non-aqueous ball point pen ink comprising: a colorant; an organic solvent; a non-Newtonian viscosity imparting agent; and a thickening agent consisting of polyvinyl pyrrolidone with a weigh-average molecular weight of about 40,000 to 55,000, wherein a non-Newtonian viscosity index of the ink is not less than 0.1 and less than 0.4, a viscosity of the ink in a shearing speed of 500 $sec^{-1}$ is not less than 1,000 and less than 3,000 mPa•s at 20° C., and the viscosity of the ink in the shearing speed of 0.19 $sec^{-1}$ is not less than 40,000 mPa•s at 20° C. and not more than 70,000 mPa•s at 20° C.

2. The non-aqueous ball point pen ink according to claim 1, wherein the content of polyvinyl pyrrolidone with the weight-average molecular weight of about 40,000 to 55,000 is in a range of 1 to 3 mass % with respect to a total amount of ink composition.

3. The non-aqueous ball point pen ink according to claim 2, wherein the non-Newtonian viscosity imparting agent is a fatty acid amide wax with a melting temperature of 140° C. or more, and the content is in a range of 2 to 5 mass % with respect to the total amount of ink composition.

4. The non-aqueous ball point pen ink according to claim 1, wherein the non-Newtonian viscosity imparting agent is a fatty acid amide wax with a melting temperature of 140° C. or more, and the content is in a range of 2 to 5 mass % with respect to the total amount of ink composition.

5. A ball point pen formed by directly filling an ink reserving tube with the non-aqueous ball point pen ink according to claim 1.

6. The ball point pen according to claim 5, wherein the ink reserving tube is a polypropylene tube with silicone applied to an inner face.

* * * * *